INVENTOR
ETIENNE ARTHUR MARIE SCHATTEMAN by: Wolfe, Hubbard, Voit & Osann
ATTYS.

Jan. 6, 1970 E. A. M. SCHATTEMAN 3,488,017

STOP SYSTEM FOR A TAPE REEL DRIVE

Filed May 31, 1966 2 Sheets-Sheet 2

INVENTOR
ETIENNE ARTHUR MARIE SCHATTEMAN

By: Wolfe, Hubbard, Voit & Osann
ATTYS.

United States Patent Office 3,488,017
Patented Jan. 6, 1970

3,488,017

STOP SYSTEM FOR A TAPE REEL DRIVE

Etienne Arthur Marie Schatteman, Wemmel, Belgium, assignor to Staar, S.A., Brussels, Belgium, a corporation of Belgium Filed May 31, 1966, Ser. No. 553,992
Claims priority, application Belgium, Nov. 16, 1965, 20,320, Patent 672,331
Int. Cl. G03b *1/02;* B65h *59/38, 25/04*
U.S. Cl. 242—191 18 Claims

ABSTRACT OF THE DISCLOSURE

Two alternative circuits are disclosed for cutting off current from tape recorder components when the recording tape has been unreeled. In the first circuit a first capacitor is periodically charged by means of a second capacitor so long as the tape spool continues to rotate and, while so charged, biases into conduction a transistor switch in the current path. In the second circuit a transistor switch in series with a current interrupting relay is biased into conduction by a charge accumulated in a first capacitor. So long as the recording tape is being unreeled, a second capacitor periodically discharges the first capacitor thereby preventing it from turning on the transistor switch so as to maintain power to the components of the tape recorder. When the tape is unreeled and its reel is stopped, the first capacitor becomes fully charged, the transistor switch conducts and the relay interrupts the supply of current.

This invention relates to apparatus for recording or playing sound and more particularly to such apparatus using tape which is transferred during operation of the unit from a supply reel to a take-up reel.

In tape recording units, it often becomes desirable to initiate some operation when the end of the tape that has been stored on the supply reel has been reached. Thus it may be desired to stop the action of the tape drive mechanism when the supply reel has been emptied or to stop or reverse the operation of the recording and playback elements of the unit. One example of this is found with multitrack tape wherein the recording or playing of information on the tape must be changed from track to track after each complete unwinding of the tape from one of the reels. In such a case, every time that the reel has been unwound, not only must the tape drive mechanism be reversed but also, the recording or playback elements must be shifted to another track of the tape.

Numerous systems have been devised for detecting the end of tape on a reel. Some systems utilize information which is on the tape and which at the proper time cooperates with an appropriate sensing device. Other systems are based on detecting a change in the tension of the tape at some point between the supply and take-up reels.

The disadvantages of the first type of system, based on the presence of special information on the tape, are readily apparent. Because the special information must not interfere with the principal operation of the recording apparatus, such systems require expensive and quite often unreliably operating sensing devices.

Systems which are based on the tape tension principle while adequate in some cases, do present certain disadvantages. For example, they are not suitable for apparatus using tapes stored in cartridges. Such cartridges are increasingly used to insure maximum protection of the tape of which only a small part is exposed for cooperation with the drive, recording, and playback elements. In order to permit cooperation with the recording and playback elements, it is the sensitive side of the tape which is thus exposed and it would be quite undesirable to subject this side of the tape to the continuous friction that is required by a tension sensing element.

Attempts have been made to use stop systems which do not require contact with the tape. Such systems operate by monitoring the position of an element cooperating with the tape supply reel when the reel has been locked for a given time in the position determined by the tension of the tape which is anchored to the reel at the end of the supply cycle. Such systems require accurate positioning of the several possible anchoring points of the tape in relation to the position of the sensing element so that operation of these systems is governed by the accuracy of several elements and they also are limited by the accuracy with which the tape tension can stop the supply reel in an exact position.

It is therefore an object of this invention to provide a stop control system which operates independently of any information on the tape, which requires no physical contact with the tape and which is independent of the relative position of components on the delivery reel and particularly of the point of anchorage of the tape on the supply reel. Another object of the invention is to provide an automatic stop system which operates regardless of whether or not the tape is anchored on its supply reel.

It is a further object of the invention to stop a tape recording apparatus or to effect some other change in the functioning of the apparatus by monitoring the rate of rotation of one of its tape handling reels. It is a related object of this invention to stop the tape drive mechanism of a tape recorder whenever the rate of rotation of one of its tape handling reels falls below a minimum without regard to the position in which the monitored reel stops.

Other objects and advantages of the invention will become apparent as the following description proceeds, taken in connection with the following drawings in which.

Figures 1, 2, 3:
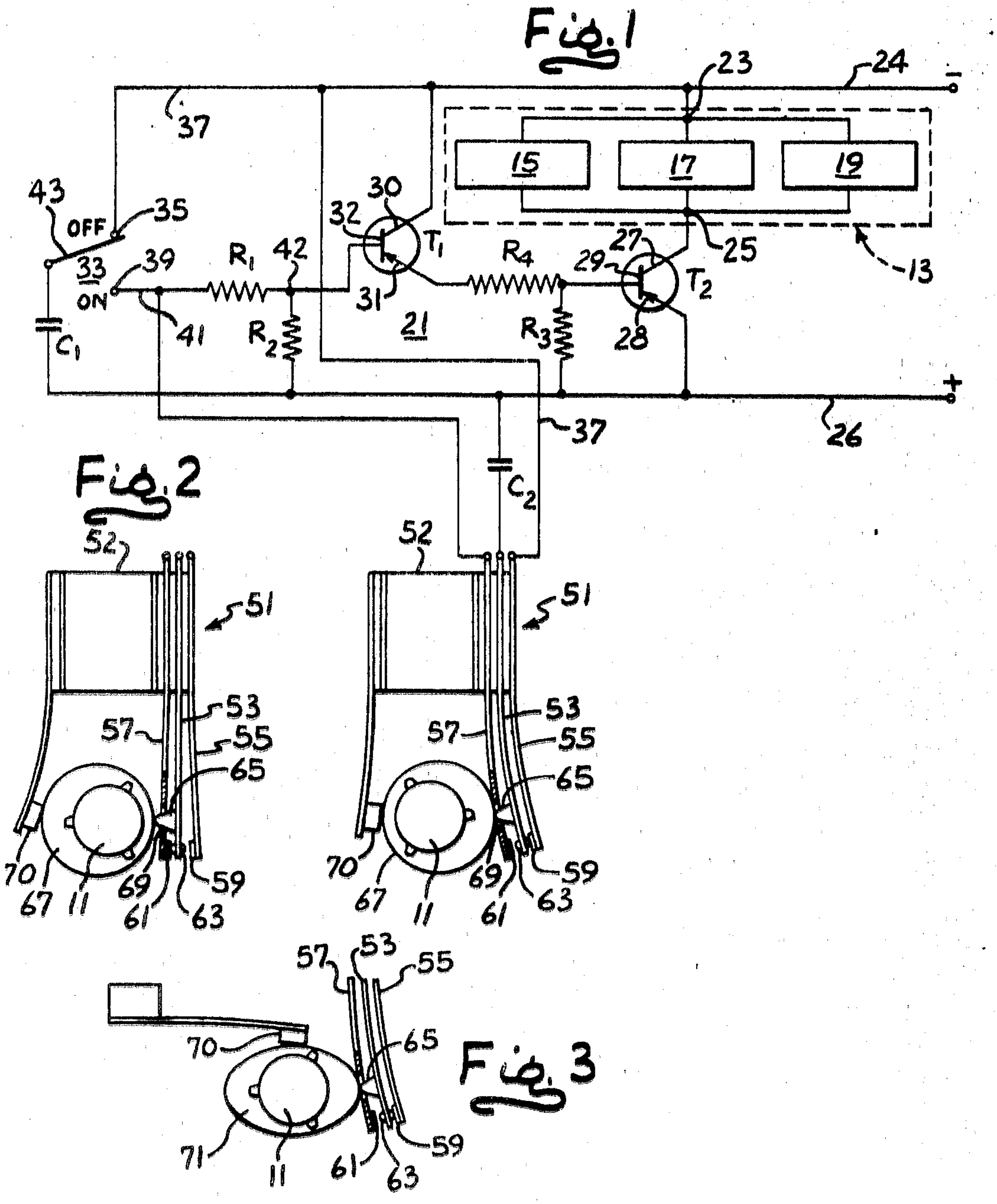
FIGURE 1 is a schematic diagram of a circuit embodying the invention and showing a transfer switch with its central contact urged against one of its stationary contacts by an eccentric cam.
FIG. 2 shows the eccentric cam in a second position in which the central contact of the transfer switch is permitted to engage a second contact of the switch.
FIG. 3 illustrates a second type of cam for causing the movable switch contact to complete two cycles of travel between the stationary switch contacts for each cycle of rotation of the cam.

While the invention is susceptible of various modifications and alternative forms, a preferred and an alternative embodiment thereof have been shown by way of example in the drawings which will herein be described in detail. It should be understood, however, that it is not intended to limit the invention to the particular forms disclosed but on the contrary, the intention is to cover all modifications, equivalents, and alternatives falling within the spirit and scope of the invention.

Turning now to the drawings, the invention in its various embodiments is applied to a tape recorder-playback apparatus in which certain components, illustratively an amplifier 15, pilot light 17 and tape drive motor 19 are to be turned off automatically when the tape has been unwound from the supply reel 12. For this purpose, according to the invention, a two stage transistor switch 21 is used which controls the supply of power to these components and which in turn is operated responsive to the stopping of the supply reel to deenergize the components.

A preferred circuit according to the invention is shown in FIG. 1. Speaking generally at first, the spindle 11 of the supply reel 12 of a tape recorder is shown near the bottom of the figure, while located near the top portion of the figure, and arranged in a parallel circuit 13, are the electrically powered components of the tape recorder which are to be deenergized automatically. The two stage transistor switch 21 which controls these components includes transistors T1 and T2. The tape recorder components to be controlled, including the amplifier 15, the pilot light 17, and the tape drive motor 19 are arranged in parallel such that a common terminal 23 is connected to the negative bus 24 leading to the negative terminal of a source of power (not shown) while the other common terminal 25 of the parallel circuit 13 is connected through the output transistor T2 to the positive bus 26 which is energized from the positive terminal of the power source.

To control flow of current through the parallel circuit 13 of the tape recorder components, the output transistor T2 of the two stage switch 21 is turned on by means including the input transistor T1. To this end, the collector 27 of the output transistor T2 is connected to one common terminal 25 of the component circuit 13, and the emitter 28 of transistor T2 is connected to the positive supply bus 26. Thus, so long as the output transistor T2 conducts, current flows from the positive bus of the power source through the transistor T2 and through the parallel circuit arrangement 13 of the tape recorder components to the negative bus 24 leading to the negative terminal of the power source.

To bias the output transistor T2 into conduction and thereby energize the tape recorder components included in the parallel circuit 13, the base 29 of the output transistor T2 is rendered negative with respect to its emitter 28. This is achieved by a circuit which includes an input transistor T1. Thus, the two stage transistor switch 21 is so arranged that while transistor T1 conducts, current flows from the positive terminal through the positive bus line 26, resistors R3 and R4 and the input transistor T1, rendering the base 29 of the output transistor T2 negative with respect to its emitter 28, and turning the output transistor T2 *on* causing it also to conduct. Thus so long as transistor T1 is turned *on*, transistor T2 continues to supply current to the tape recorder components.

To perform its switch function, the input transistor T1 is arranged with its collector 30 connected to the negative bus lines 24 and with resistor R4 connected between the emitter 31 of the input transistor T1 and the base 29 of the output transistor T2. The input transistor T1 is biased into nonconduction by a resistor R2 which connects its base 32 to the positive bus line 26.

In accordance with the invention means are provided for maintaining transistor T1, and therefore transistor T2, conductive only so long as the supply reel 12 continues to rotate above a predetermined minimum rate. In keeping with this feature of the invention, means are provided for storing a charge, for leaking off the charge at a predetermined rate and for replenishing the charge at a rate which is proportional to the rate of rotation of the supply reel 12 and which exceeds the rate at which charge is leaked off only so long as the supply reel 12 rotates above its predetermined minimum rate. A voltage established by the stored charge is then applied to turn the input transistor T1 *on* so long as the charge continues to be replenished due to the continued rotation of the supply reel 12 at an adequate rate. Consequently, so long as the supply reel 12 rotates at such a rate, both of the transistors T1 and T2 continue to conduct and current continues to flow through the transistor T2 to the electrically powered elements 13 of the recorder.

For storing charge, a first capacitor C1 is provided with one of its terminals connected to the positive supply line 26. The other terminal of the capacitor C1 is connected to the movable contact 43 of a single pole double throw switch 33 which is a manually operable power switch used to turn the unit *on* or *off*. The power switch 33 has a first stationary contact 35 which is connected through line 37 to the negative supply line 24, and a second stationary contact 39 which is connected through line 41 and through the resistor R1 to the base 32 of the input transistor T1.

To pre-charge C1 prior to the operation of the tape recorder, the movable switch contact 43 is normally engaged with the stationary switch contact 35 in the *off* position of the power switch 33. In this position the capacitor C1 is connected across the power supply lines 26 and 24, the connection being from line 26 through capacitor C1, switch contacts 32 and 35, and line 37 to the line 24.

To start the recorder, the switch 33 is placed it its *on* position, causing the pre-charged charge storing capacitor C1 to discharge through the line 41 and the resistors R1 and R2 into the positive supply line 26. The result is an initial flow of current from the positive supply line 26 through resistors R2 and R1 into the capacitor C1, thus rendering the junction 42 of the resistors R2 and R1 connected to the base 32 of transistor T1 sufficiently negative to turn *on* the transistor T1. As described previously, this in turn renders the output transistor T2 conductive and energizes the electrical components 13 and among them the tape drive motor 19, which begins to rotate the tape reel spindle 11 at its prescribed rate.

If nothing further were done to replenish the charge upon the charge storing capacitor C1, that charge would soon be dissipated through the resistors R1 and R2 and transistors T1 and T2 would then immediately be turned *off* as the result of the normally positive bias which is applied by the resistor R2 to the base of transistor T1. In further keeping with the invention, means are, therefore, provided for replenishing the charge upon the charge storing capacitor C1 by means which are responsive to the continued rotation at its rated speed of the reel spindle 11. Specifically, to act as a carrier of charge, a second capacitor C2 is provided, together with means for alternately connecting the charge transfer capacitor C2 across a source of charging potential and across the charge storing capacitor C1 so as to cause the charge transfer capacitor C2 alternately to charge itself and to discharge into the capacitor C1 so as to charge it.

As used in the circuit of FIG. 1, one terminal of the charge transfer capacitor C2 is connected to a terminal of the charge storing capacitor C1 which in FIG. 1 happens to be the terminal which is connected to the positive supply line 26. The other terminal of the charge transfer capacitor C2 is connected to the central or swinging arm 53 of a switch 51 mounted on a support member 52 attached to the frame of the recorder. Also forming part of the switch 51 are a pair of stationary contact arms 55 and 57 on opposite sides of the swinging arm 53. Carried at the end of the stationary contact arms 55 and 57 and facing inwardly are electric contacts 59 and 61 respectively. Mounted on the end of the swinging arms 53 and adapted alternately to engage one or the other of the contacts 59 and 61 is a contact 63.

The stationary contact arm 55 is connected through line 37 to the negative power supply line 24 so that while the contact 63 of the swinging arm 53 engages the contact 59 of the stationary contact arm 55, the charge transfer capacitor C2 will be connected across the supply lines 26 and 24 so as to be charged.

The stationary contact arm 57 is connected through line 41 and through contacts 39 and 31 of switch 33 to the bottom terminal of the charge storing capacitor C1 so that while the contact 63 of the swinging contact arm 53 engages the contact 61 of the stationary contact arm 57, the charge transfer capacitor C2 will be connected across the charge storing capacitor C1 so as to transfer the charge accumulated by the capacitor C2 to the capacitor C1.

In keeping with the invention, the charge transfer capacitor C2 is periodically charged and discharged so long as the supply reel 12 continues to rotate, and is discharged when the supply reel 12 stops, to cause the transistor switch T1 to turn off the recorder components. Periodic charge and discharge of the capacitor C2 is caused by driving the center contact 63 back and forth between the outer contacts 59 and 61 of the stationary contact arms 55 and 57 in response to the rotation of the reel spindle 11. For this purpose, the swinging arm 53 is provided with a cam follower 65 and mounted on the spindle 11 to guide the cam follower 65 is an eccentric cam 67. To permit the cam follower 65 to engage the cam 67, the stationary contact arm 57 is provided with an opening 69, and the cam follower 65 reaches through the aperture 69 to engage the surface of the cam 67. Continued and steady engagement of the cam follower 65 with the cam 67 is assured by the swinging arm 53 which exerts a continued biasing force upon the cam follower towards the cam 67. As a result, once during every revolution of the cam 67, the contact arm 53 swings toward the reel spindle 11 until its contact 63 engages the contact 61 of stationary contact arm 57 (FIG. 2). Also once during each revolution of the spindle 11 the swinging contact arm 53 is forced by the cam 67 away from the spindle 11 until its contact 63 engages the contact 59 at the end of the stationary contact arm 55 (FIG. 1). As the charge transfer capacitor C2 continues to be switched between the power supply lines 24 and 26 and the charge storing capacitor C1, the latter capacitor continues to discharge through the resistors R1 and R2 so as to maintain the transistors T1 and T2 conducting, the direction of current flow through resistors R1 and R2 being such as holds the base of transistor T1 sufficiently negative to maintain the transistor conductor. The capacitance values of the capacitors C1 and C2 are selected so that their biasing action on the base of the transistor T1 is maintained between successive actions of the cam 67 upon the swinging arm 53 of the switch 51 for periods corresponding to the slowest contemplated rate of rotation of the spindle 11 during movement of the tape in the tape recorder.

The tape supply reel 12 which is turned by the spindle 11 may be of the type wherein the tape is anchored to the supply reel so that when the supply reel stops by virtue of unwinding all of its tape, both the supply reel and the take-up reel stop, since the take-up reel is generally driven only by friction so as not to interfere with those drive elements which move the tape at constant linear speed. Alternatively, the supply reel driven by the spindle 11 may be of the type wherein the tape is not anchored to the supply reel so that only the supply reel stops rotating when the tape originally on it is completely unreeled since the tape which has left the reel no longer drives it against the slight breaking which is normally exerted upon the supply reel so as to provide the required tape tension. It is an important result of the invention that regardless of whether an anchored or an unanchored reel is used, after the supply reel carried by the spindle 11 stops rotating the capacitor C1 ceases to be charged under the action of the rotating spindle 11 through the transfer capacitor C2, and rapidly discharges, thus causing transistors T1 and T2 to be rendered nonconductive and the electrically powered devices to be turned *off*.

In particular, when the spindle 11 coasts or brakes to a stop, the cam 67 stops its intermittent action on the swinging contact 53, and the capacitors C1 and C2 or the capacitor C1 alone, depending upon the position in which the cam 67 is stopped in relation to the cam follower 65, discharge completely and stop their negatively biasing action on the base of transistor T1. As a result, the input transistor T1 stops conducting current through the resistors R4 and R3. When this happens, the junction of resistors R3 and R4 rises from its previously negative potential which tended to maintain the output transistor T2 conducting to a more positive potential, cutting transistor T2 off and and interrupting the flow of current to the electrically powered components including the tape drive motor 19.

To start the tape recorder-player for a subsequent operation after it has been automatically shut *off*, the manual switch 43 is first moved from the *on* position in which it remained to the *off* position thus to precharge the capacitor C1, and is then returned to its *on* position.

The uneven drag upon the cam 67 is compensated for by mounting the shoe 70 diagonally opposite the cam follower 65 so that when the pressure exerted by the cam follower 65 upon the cam 67 is at its greatest, the pressure exerted by the brake shoe 70 upon the cam 67 is at its minimum.

In cases where it is desired to increase the rate at which charge is transferred to the storage capacitor C1 through the charge transfer capacitor C2, the generally elliptically shaped cam 71 of FIG. 3 may be employed. In this type of cam, the distance between the cam surface and the axis upon which it revolves is changed four times during each cycle from a maximum in the position in which the cam is shown in FIG. 3 to a minimum at 90° of rotation later to a maximum again at 180°, a second minimum at 270° and to a maximum again when the cam has completed a 360° turn. It will be understood by anyone skilled in the art that other types of cams having an even larger number of operative cycles per revolution may be employed.

Figure 4:
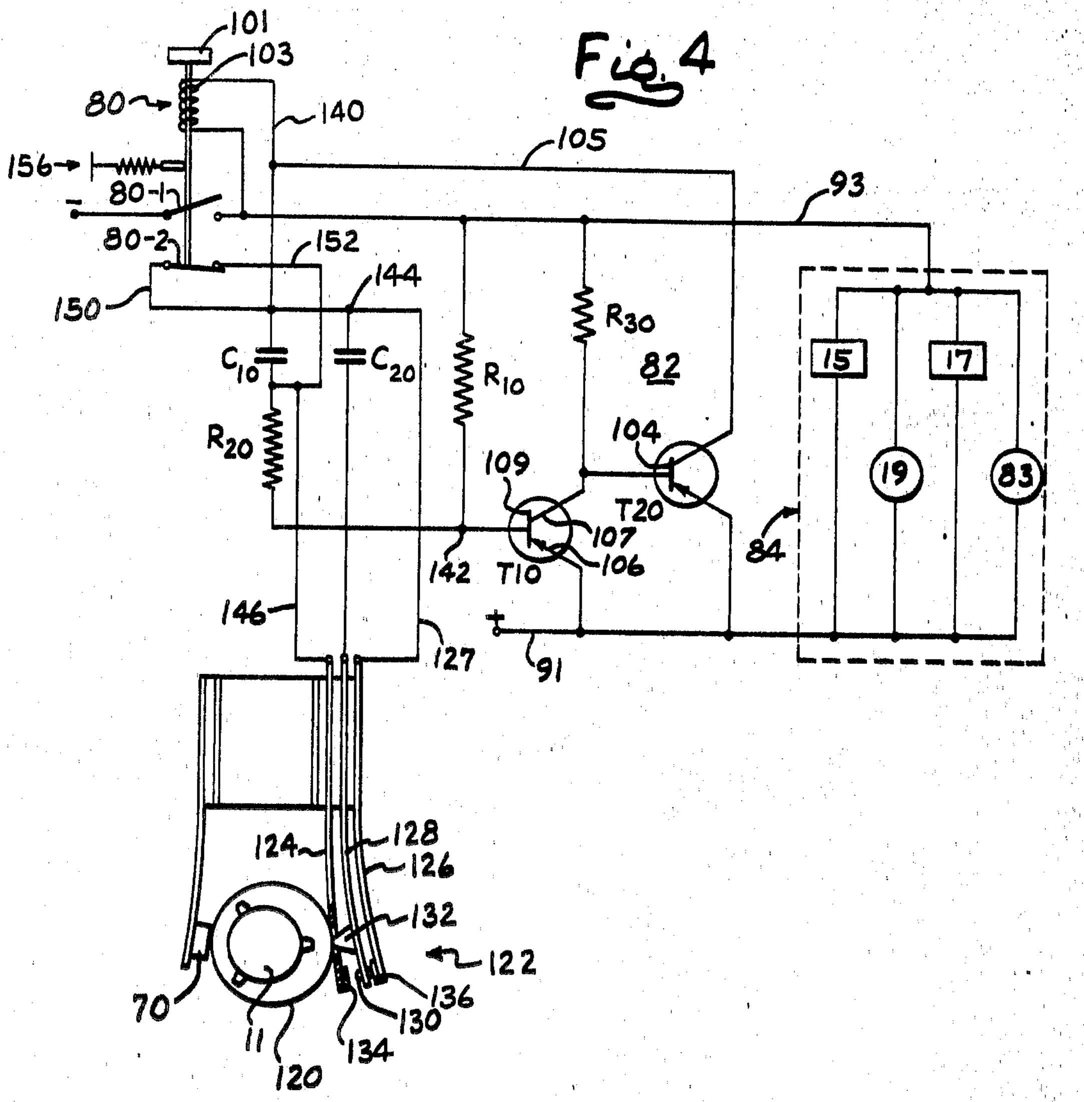
FIG. 4 is a schematic diagram of another circuit embodying the invention.

A second circuit for carrying out the invention is shown in FIG. 4. In general the circuit of FIG. 4 utilizes the same type of cam actuated switch as that shown in FIG. 1, but employs a different form of transistor switch for turning *off* the electrical components of the tape recorder when the rate of rotation of the supply reel spindle 11 has fallen below a predetermined limit. It will be recalled that in FIG. 1 a two stage transistor switch whose output is connected in series with certain electrically powered components of the recorder, is maintained closed by periodically recharging a storage capacitor in response to the proper rotation of the supply reel spindle 11 of the recorder. In contrast, in the circuit of FIG. 4 an electric relay 80 is used to control the supply of power to the electrically powered components of the tape recorder. The relay 80, in this case is operated by a two stage transistor switch 82 to interrupt power to the components of the unit in response to the supply reel stopping its rotation.

Thus, so long as the spindle 11 rotates at a sufficient rate, switch 82 is kept open by periodically discharging a charge storing capacitor C10 by means of a charge transfer capacitor C20. The rate at which a charge is removed from the charge storing capacitor C10 by the charge transfer capacitor C20 is determined by the rate of rotation of the spindle 11. When the spindle stops, the capacitor C10 is permitted to charge, the transistor switch is turned *on*, the relay is energized, and power to the electrically powered components is interrupted.

Turning to the circuit in more detail, the electrically powered components of the tape recorder that are to be deenergized when the tape reel spindle 11 stops include, as in FIG. 1, an amplifier 15, a pilot light 17, a tape drive motor 19, and may optionally also include a power outlet 83 for powering auxiliary equipment such as an additional amplifier. The electrically powered components are connected in a parallel circuit 84 across a positive supply line 91 and a negative supply line 93. To control the supply of power to these components, the negative supply 93 is connected to the negative terminal of a source of power through the contacts 80–1 of the relay 80. Means such as a pushbutton 101 are provided to close the contacts 80–1 so as to close the supply circuit through the components thereby starting the recorder of which they form a part. The coil 103 of the relay 80 when energized lifts the armature of the relay and opens the contacts 80–1, so as to interrupt the flow of current through the tape recorder components.

The relay coil 103 is energized when the rate of rotation of the spindle 11 drops below a predetermined lower limit or when the spindle stops. To energize the coil 103, the output transistor T20 of the transistor switch 82, which is normally nonconducting, is caused to conduct by means including the input transistor T10.

In the two stage switch 82, the input transistor T10 is normally biased into conduction so as to keep the transistor T20 from conducting by means of a resistor R20, capacitor C10 and relay coil 103 coupling the base 109 of the input transistor T10 to the negative supply line 93. The output transistor T20 is maintained nonconducting by connecting the collector 107 of the input transistor T10 to the base 104 of the output transistor T20 while the emitter 106 of the input transistor T10 is connected to the positive supply line 91, such that while the input transistor T10 is conducting, it provides a low impedance between the base 104 of the transistor T20 and the positive supply line 91. This causes the base 104 of the output transistor T20 to rise from the otherwise negative level at which it is maintained by the resistor R30 to a level near that of the voltage on the supply line 91 and cuts off the output transistor T20.

When the recorder is turned *on* by pushing down on the pushbutton 101, the negative supply line 93 is energized through the relay contacts 80–1 and supplies power to all of the electrically powered components of the recorder. The circuit arrangement of FIG. 4 is such that so long as the spindle 11 and its supply reel continue to rotate the output transistor T20 is held cut off by the input transistor T10 and thus does not supply any current to the relay coil 103 through the line 105, and the recorder and all of its components continue to operate. In response to the complete unwinding of the tape, which may be indicated by the stopping of either the spindle of the supply reel or the spindle of the take-up reel of the recorder, means are provided to cut off power from the negative supply line 93 by energizing the relay 80.

Rotation of the spindle 11 is monitored by a mechanism which is substantially the same as that shown in FIG. 2 and which includes an eccentric cam 120 mounted on the reel spindle 11 and a switch 122 mounted in proximity to the spindle 11 upon the frame of the recorder. Mounted in the same manner as in FIG. 1 are a pair of stationary contacts 124 and 126 and a swinging contact 128. As will be recalled from the earlier explanation of this arrangement in connection with FIG. 1, the swinging contact arm 128 supports at its end an electrical contact 130 which, under the cooperative action of the cam 120 and the cam follower 132 on the swinging contact 128, is caused to alternately engage contacts 134 and 136 on the stationary contact arms 124 and 126 respectively. With the type of cam shown in FIG. 4, the contact 130 engages the contacts 134, 136 during alternate halves of its cycles of revolution.

In accordance with the invention, means are provided for disabling the input transistor T10 responsive to the spindle 11 stopping. For this purpose, the base 109 of the input transistor T10 is connected through resistor R20 and a charge storing capacitor C10 to the negative supply line 93, the circuit being completed through the line 140 and relay coil 103. When the capacitor C10 is fully charged through the resistor R20, the junction 142 of resistor R20 and the base of transistor T10 rises sufficiently above the normally negative level of this point to cut off the transistor T10 which in turn permits transistor T20 to turn *on* so as to energize the relay 80 and cut off power from the recorder components.

In further keeping with the invention, means are provided for preventing the capacitor C10 from attaining a charge sufficient to raise the voltage at the base of transistor T10 sufficiently to cut off that transistor. To this end, a charge transfer capacitor C20 is provided, having one of its terminals connected to the capacitor C10 and having its other terminal connected to the swinging arm 128 of the switch 122. One stationary arm 126 of the switch is connected through the line 127 to the junction 144 of the capacitors C10 and C20 so that when contact 130 of the swinging arm 128 engages contact 136 of the stationary arm 126, the charge transfer capacitor C20 is short circuited and is discharged.

The contact 134 of the other stationary contact arm 124 is connected through line 146 to the other terminal of the capacitor C10 so that when the swinging arm 128 carries its contact 130 into engagement with the contact 134, the charge transfer capacitor C20 is connected through line 146 in parallel with the capacitor C10 so as to dissipate or absorb some of the charge which was fed to the capacitor C10 through the resistor R20 and the base emitter junction of transistor T10 during the previous part of the cycle.

Thus as the spindle 11 rotates, the capacitor C10 is alternately charged through the resistor R20 and discharged by the capacitor C20. The capacitances of the storage capacitor C10 and the charge transfer capacitor C20 are so selected that neither C10 nor the combination of C10 and C20 reach a charge voltage approaching that of the supply source as long as the switch 122 intermittently discharges the capacitor C20 and through it, the capacitor C10 at periods which correspond to the slowest rotation of the spindle 11 with tape on the reel.

Provision is also made to assure that before the recorder is initially turned *on*, the storage capacitor C10 shall have been discharged. This is necessary since it follows from the previous explanation of the operation of the circuit that when the recorder is stopped under the action of the automatic stop circuit, the capacitor C10 will, as part of the operation of that circuit, become fully charged, since it is the fully charged condition of the capacitor C10 which causes the transistor T10 to turn *off* and the transistor T20 to be turned *on*. Accordingly, a second set of contacts 80–2 is provided on the relay 80, these contacts being closed when the contacts 80–1 are open, that is, before the recorder is initially turned *on*.

When closed, the normally open relay contacts 80–2 are connected across the storage capacitor C10 through lines 150 and 152. As a result, when the relay contacts 80–2 are closed, capacitor C10 is discharged.

Although the operation of the different portions of the circuit have been explained fully in connection with the description of those portions, an overall description of the operation of this circuit will be helpful.

Initially, before the apparatus has been started, the relay contacts 80–1 are open and the contacts 80–2 are closed so that capacitor C10 is fully discharged. Additionally, if the swinging arm 128 came to rest during the last cycle of operation of the tape recorder with its contact 130 in engagement with the contact 134 of one stationary arm 124, the charge transfer capacitor C20 is connected across the storage capacitor C10 and with it is also discharged through the relay contacts 80–2. On the other hand, if the swinging arm 128 came to rest with its contact 130 in engagement with the contact 136 of the other stationary contact arm 126, the charge transfer capacitor C20 is short circuited through the line 127 and is discharged through that connection.

The recorder is turned *on* by closing the relay contacts

80–1 usually by depressing the pushbutton 101. Means are also provided, illustratively a spring biased latching detent 156, for maintaining the contacts 80–1 closed and the negative supply line 93 connected to the negative terminal of the power source to energize the tape recorder components in the parallel circuit 84. Connection of the negative power line 93 to the power source terminal also energizes the switching circuit 122.

With the tape drive motor 19 thus energized, the spindle 11 begins to turn, either under the direct action of the motor, if the spindle 11 is that of the take-up reel or under the action of the recording tape if the spindle 11 is associated with the supply reel. With each revolution of the spindle 11, the cam 120 translates the swinging arm 128 of the switch 122 betwen the stationary contact arms 124 and 126 causing the contacts 130 to engage contacts 134 and 136 alternately. With the contact 130 engaging contact 136, capacitor C20 is short circuited through the line 127 and capacitor C10 is charged from the negative supply terminal through relay contacts 80–1, relay coil 103, line 140, resistor R20, base 109 and emitter 106 of transistor T10, and through positive supply line 91 to the positive supply terminal.

When the switch contact 130 is swung over by the contact arm 128 under the influence of the cam 120 to engage the other stationary switch contact 134, the charge transfer capacitor C20 is connected in parallel with the charge storing capacitor C10 and having been discharged while the capacitor C10 was being charged, its connection across the capacitor C10 causes the charge of that capacitor to be reduced. While the charge transfer capacitor C20 is thus connected across the capacitor C10 in order to dissipate its charge, both capacitors C10 and C20 continue to receive charge from the charge path of the capacitor C10 described previously.

The alternating charging, discharging, and recharging of the storage capacitor C10 is repeated during each operating cycle of the switch 122 under the action of cam 120. With proper selection of the capacitance values for capacitors C10 and C20, the average rate at which charge is transferred from charge storing capacitor C10 to the charge transfer capacitor C20 is sufficiently great so that neither the capacitor alone nor the two capacitors in parallel are ever fully charged so long as the spindle 11 rotates above its minimum operational rate. Consequently, so long as the spindle 11 maintains this rate of rotation, the input transistor T10 is maintained in conduction so as to cut off the output transistor T20, thereby preventing that transistor from actuating the relay 80 and interrupting the switch deck 80–1.

If the spindle 11 should stop rotating due to the tape having been unreeled, the charge storing capacitor C10 (or the two capacitors in parallel if the cam 120 has come to rest so as to cause contact 130 to engage contact 134), charges up very quickly to a charge voltage equal to the supply voltage. As a result, the base 109 of the input transistor T10 is no longer sufficiently negative to maintain the transistor T10 conductive. The input transistor T10 therefore turns *off* and its collector voltage drops, permitting the output transistor T20 to be biased *on*. In turn, the output transistor T20 energizes the relay coil 103 through line 105 causing the relay 80 to open its contacts 80–1 and to close its contacts 80–2. Opening contacts 80–1 interrupts power to the negative bus 93 and to all of the components of the machine including the transistor 82. Closing of contacts 80–2 of the relay 80 on the other hand, causes the capacitor C10 (or the capacitors C10 and C20 if the movable switch contacts 130 came to rest against the stationary contact 134) to be discharged in readiness for a subsequent restarting of the recorder, as described previously.

The resistor R10 provides a discharge path for the capacitor C10 in the event of failure of the contacts 80–1 of the relay 80 to open when the relay coil 103 is energized, and in that case it causes the transistor T10 to be biased into conduction to prevent T20 from being overloaded.

While two specific circuits and actuating means have been described for shutting off power to selected components of the tape recorder in response to stopping of the tape reel spindle 11, modifications of such circuits and actuating means for performing this function may occur to those skilled in the art.

The present invention finds special utility in recorders using tape cartridges to cause the tape cartridge to be released and to be brought into removal position when the tape has been completely transferred from one reel to the other. Apparatus of this type is disclosed in Patent application Ser. No. 590,613, filed Oct. 31, 1966 and assigned to the assignee of the present invention, which apparatus includes a solenoid for releasing the tape cartridge, such a solenoid being operable by a stop system constructed in accordance with this invention so as automatically to release the cartridge.

I claim as my invention:

1. In a tape recorder-player of the type wherein tape is fed by means of a tape drive from a supply reel to a take-up reel, an automatic stop system comprising, in combination:

switching means connected to said tape drive and adapted to be closed to connect a source of power to start said drive, said switching means remaining closed upon rotation of a selected one of said reels by said drive, and rotational rate responsive control means operated by said selected reel independently of the tension of said tape between said reels for opening said switching means in response to a drop in the rotation of said selected reel below a predetermined minimum finite rate to stop said drive.

2. A device for automatically deenergizing components of a tape recorder-player unit in response to the stoppage of rotation of a tape reel of said unit comprising, in combination:

a capacitor, electrically energizable switching means having a pair of contacts connected between a source of power and said components of said unit, said contacts being opened when said switching means is energized, means for closing said contacts to start said recorder, control means having an input connected to said capacitor and an output connected to said switching means for opening its contacts in response to a predetermined charge on said capacitor, means connected to said capacitor for feeding an electric charge to it, and means responsive to the rotation of said reel for removing electric charge from said capacitor so as to prevent said capacitor from accumulating said predetermined charge only so long as said reel continues to rotate.

3. A device according to claim 2 further comprising means operable when said contacts are opened providing a discharge path for a charge on said capacitor to discharge said capacitor.

4. In a self-arresting drive for a tape recorder-player having a tape handling reel, electrically powered means adapted to be connected to a source of power for driving said reel at a predetermined rate, a switching circuit comprising, in combination:

a manually operated switch connected between said electrically powered means and said source of power, a transistor which is biased to conduct upon the closing of said switch, relay means connected to open said switch upon being energized, means connecting said transistor to energize said relay upon cut off of said transistor, and means operated by said reel for biasing said transistor to cut off in response to a drop in the rotation of said reel below a predetermined minimum rate to stop said electrically powered means.

5. In a self-arresting drive for a tape recorder-player having a tape handling reel, electrically powered means adapted to be connected to a source of power for driving said reel at a predetermined rate, a switching circuit comprising, in combination:

a manually operated switch connected between said electrically powered means and said source of power, a transistor which is biased to conduct upon the closing of said switch, relay means connected to open said switch upon being energized, means connecting said transistor to energize said relay upon cut off of said transistor, a capacitor connected to said transistor, and control means operated responsive to the continuous rotation of said reel for maintaining a predetermined charge on said capacitor and for changing said charge on said capacitor and thereby biasing said transistor to cut off in response to a drop in the rate of rotation of said reel below a predetermined minimum.

6. A device for automatically deenergizing components of a tape recorder-player unit in response to the stoppage of rotation of a tape reel of said unit comprising, in combination:

a first capacitor, a relay having (1) a coil and (2) a pair of contacts connected between a source of power and said components, means for closing said contacts to start said unit and means for opening said contacts when said relay coil is energized, control means having an input connected to said first capacitor and an output connected to said relay coil for energizing said relay coil and for deenergizing said components in response to a predetermined electric charge on said first capacitor, means connected to said capacitor for feeding an electric charge to it, a second capacitor, a discharge path for said second capacitor, switching means actuated in response to the rotation of said reel for alternately discharging said first capacitor through said second capacitor, and said second capacitor through said discharge path at a rate which is sufficiently great to prevent the accumulation of said predetermined charge on said first capacitor so long as said reel rotates at a predetermined speed.

7. In a tape recorder-player of the type wherein tape is fed by means of a tape drive from a supply reel to take-up reel, an automatic stop system comprising, in combination:

switching means connected to said tape drive and adapted to be closed to connect a source of power to start said drive, and control means for maintaining said switching means closed in response to the continuous rotation of a selected one of said reels by said drive for maintaining said switching means closed and said drive operative, and for opening said switching means in response to a drop in the rotation of said selected reel below a predetermined finite rate to stop said drive, said control means being characterized by a circuit maintaining a control signal which varies with the rate of rotation of said reel.

8. In a self-arresting drive for a tape recorder-player having a tape handling reel, electrically powered means adapted to be connected to a source of power for driving said reel at a predetermined rate, a switching circuit comprising, in combination:

a manually operated switch connected between said electrically powered means and said source of power, a transistor which is biased to conduct upon the closing of said switch, relay means connected to open said switch upon being energized, means connecting said transistor to energize said relay upon cut off of said transistor, a capacitor connected to said transistor, and control means operated responsive to the continuous rotation of said reel for maintaining a predetermined charge on said capacitor and for changing said charge on said capacitor and thereby biasing said transistor to cut off in response to a drop in the rate of rotation of said reel below a predetermined minimum, said control means including means for cyclically charging and discharging said capacitor during a single revolution of said reel to maintain said predetermined charge on said capacitor so long as said reel continuously rotates above said predetermined minimum rate of rotation.

9. In a tape recorder-player of the type wherein tape is fed by means of a tape drive from a supply reel to a take-up reel, an automatic stop system comprising, in combination:

means for storing an electric charge, switching means connected to said tape drive, adapted to be closed to connect a source of power to start said drive, and responsive to the accumulation of a predetermined charge in said storing means to remain closed, means for removing charge from said storing means at a predetermined discharge rate, and means responsive to rotation of one of said reels for feeding a charge to said storing means at a rate which is at least equal to said discharge rate so long as the rate of rotation of said reel remains at a predetermined minimum rate.

10. In a tape recorder-player of the type wherein tape is fed by means of a tape drive from a supply reel to take-up reel, an automatic stop system comprising, in combination:

a charge storing capacitor, switching means connected to said tape drive, adapted to be closed to connect a source of power to start said drive, and responsive to the accumulation of a predetermined charge in said storing capacitor to remain closed, means for removing charge from said storing capacitor at a predetermined discharge rate, and a charge transfer capacitor and means for alternately connecting said charge transfer capacitor to said charge storing capacitor and to a source of potential responsive to rotation of one of said reels so as to feed a charge to said charge storing capacitor at a rate which is at least equal to said discharge rate so long as the rate of rotation of said reel remains at a predetermined minimum rate.

11. In a tape recorder-player of the type wherein tape is fed by means of a tape drive from a supply reel to a take-up reel, an automatic stop system comprising, in combination:

a charge storing capacitor, switching means connected to said tape drive, adapted to be closed to connect a source of power to start said drive, and responsive to the accumulation of a predetermined charge in said storing capacitor to remain closed, means for removing charge from said storing capacitor at a predetermined discharge rate, and a charge transfer capacitor and means for alternately connecting said charge transfer capacitor to said charge storing capacitor and to a source of potential responsive to rotation of one of said reels so as to feed charge to said charge storing capacitor at a rate which is at least equal to said discharge rate so long as the rate of rotation of said reel remains at a predetermined minimum rate, said means for alternately connecting said charge transfer capacitor including a switch having (1) a pair of stationary, closely spaced contacts one of said contacts being connected to said charge storing capacitor and the other of said contacts being connected to said source of potential, and (2) a movable contact electrically connected to said charge transfer capacitor, and being mounted between said stationary contacts upon a flexible contact arm, said arm normally biasing said movable contact against one of said stationary contacts, a shaft connected to said reel to rotate therewith, a cam mounted upon said shaft, and a cam follower mounted upon said contact arm and biased by said arm into engagement with said cam so that as said cam revolves with said reel, said movable contact is alternately transferred between said stationary contacts.

12. In a tape recorder-player of the type wherein tape is fed by means of a tape drive from a supply reel to a take-up reel, an automatic stop system comprising, in combination:

a charge storing capacitor, switching means connected to said tape drive, adapted to be closed to connect a source of power to start said drive, and responsive to the accumulation of a predetermined charge in said storing capacitor to remain closed, means for removing charge from said storing capacitor at a predetermined discharge rate, and a charge transfer capacitor and means for alternately connecting said charge transfer capacitor to said charge storing capacitor and to a source of potential responsive to rotation of one of said reels so as to feed a charge to said charge storing capacitor at a rate which is at least equal to said discharge rate so long as the rate of rotation of said reel remains at a predetermined minimum rate, said means for alternately connecting said charge transfer capacitor including a switch having (1) a pair of stationary, closely spaced contacts one of said contacts being connected to said charge storing capacitor and the other of said contacts being connected to said source of potential, (3) a movable contact electrically connected to said charge transfer capacitor, and being mounted between said stationary contacts upon a flexible contact arm, said arm normally biasing said movable contact against one of said stationary contacts, a shaft connected to said reel to rotate therewith, a cam mounted upon said shaft, a cam follower mounted upon said contact arm and biased by said arm into engagement with said cam so that as said cam revolves with said reel, said movable contact is alternately transferred between said stationary contacts, and a brake shoe and a spring arm for urging said brake shoe against said cam with a force which is inversely proportional to the force with which said contact arm urges said cam follower against said cam so as to maintain the total force upon said cam substantially constant.

13. In a tape recorder-player of the type wherein tape is fed by means of a tape driving component from a supply reel to a take-up reel, an automatic stop system comprising, in combination:

circuit means for controlling the operating mode of said components responsive to a drop in the rotation of a selected one of said reels below a predetermined minimum finite rate, said circuit means including switching means operatively coupled to said driving component and having at least two operative states, and rotational rate responsive control means operated by said selected reel independently of the tension of said tape between said reels for holding said switching means in one of said states in response to rotation of said slected reel by said driving component and for placing said switching means in the other state in response to a drop in rotation thereof below said minimum finite rate.

14. The automatic stop system of claim 13 further characterized in that said tape driving component is an electric motor adapted to be connected to a source of power, and said switching means includes a switch connected between said motor and said source, with said switch being closed when said switching means is placed in said one of its states and being opened when said switching means is placed in said other of its states.

15. The stop system of claim 14 further characterized in that said switching means additionally includes a relay connected to be deenergized and to cause said switch to be closed when said switching means is in said one of its states and connected to be energized and to cause said switch to be opened when said switching means is in said other of its states.

16. The automatic stop system of claim 13 further characterized in that said control means includes means for maintaining a predetermined voltage when the rotational speed of said reel equals said finite rate and a lesser voltage when said rotational speed drops below said finite rate, and means responsive to said predetermined voltage for holding said switching means in said one of its states and responsive to said lesser voltage for placing said switching means in said other of its states.

17. The automatic stop system of claim 13 further characterized in that said control means is supplied with a variable voltage and includes means for allowing said voltage to exceed a predetermined level when the rotational speed of said reel drops below said minimum finite rate and to remain below said predetermined level when said rotation speed of said reel equals said minimum finite rate, and means responsive to said voltage when below said predetermined level for holding said switching means in said one of its states and responsive to said voltage rising above said predetermined level for placing said switching means in said other of its states.

18. In a tape recorder-player of the type wherein tape is anchored to and fed by means of a tape driving component between a supply reel and a take-up reel within a single cartridge which is readily removable from said recorder-player, an automatic stop system comprising:

means completely external to said cartridge for controlling the operating mode of said component responsive to a drop in the rotation of a selected one of said reels below a predetermined rate, said means including in combination:

switching means operatively coupled to said tape driving component and having at least two operative states, and rotational rate responsive control means operated by said selected reel independently of the tension of said tape between said reels for holding said switching means in one of said states in response to rotation of said reels by said driving component at said predetermined rate and for placing said switching means in the other state in response to a drop in rotation thereof below said predetermined rate.

(References on following page)

References Cited

UNITED STATES PATENTS

| | | | |
|---|---|---|---|
| 2,514,402 | 7/1950 | Lyon | 200—61.17 X |
| 2,590,518 | 3/1952 | Duncan et al. | 200—61.17 |
| 2,782,902 | 2/1957 | Sloane | 200—61.17 X |
| 2,000,698 | 5/1935 | Hanna | 242—57 |
| 2,601,140 | 6/1952 | Hines | 200—61.46 X |
| 2,954,940 | 10/1960 | Herrmann | 242—55.12 |
| 2,963,235 | 12/1960 | Pedersen et al. | 242—58.3 |
| 3,012,157 | 12/1961 | Baring et al. | 200—61.46 X |

GEORGE F. MAUTZ, Primary Examiner

U.S. Cl. X.R.

200—61.17; 242—57; 307—120